US009384612B2

(12) United States Patent
Lopez

(10) Patent No.: US 9,384,612 B2
(45) Date of Patent: Jul. 5, 2016

(54) DISTRIBUTING CAPTURED CODES

(71) Applicant: Secured Mobility, LLC, Georgetown, TX (US)

(72) Inventor: Emmanuel Enrique Lopez, Georgetown, TX (US)

(73) Assignee: Secured Mobility, LLC, Georgetown, TX (US)

( * ) Notice: Subject to any disclaimer, the term of this patent is extended or adjusted under 35 U.S.C. 154(b) by 167 days.

(21) Appl. No.: 14/211,814

(22) Filed: Mar. 14, 2014

(65) Prior Publication Data

US 2014/0266579 A1 Sep. 18, 2014

Related U.S. Application Data

(60) Provisional application No. 61/793,858, filed on Mar. 15, 2013.

(51) Int. Cl.
*G05B 19/00* (2006.01)
*G07C 9/00* (2006.01)

(52) U.S. Cl.
CPC ........ *G07C 9/00571* (2013.01); *G07C 9/00817* (2013.01)

(58) Field of Classification Search
CPC ........... G07C 9/00007; G07C 9/00571; G07C 9/00817; B60R 13/10; B60R 25/102; B60R 25/30; G01S 13/74; G01S 13/75; G01S 13/751; G01S 13/785; G01S 2013/936
See application file for complete search history.

(56) References Cited

U.S. PATENT DOCUMENTS

| | | | | |
|---|---|---|---|---|
| 3,821,704 | A | 6/1974 | Sabsay | |
| 4,652,860 | A | 3/1987 | Weishaupt et al. | |
| 4,926,665 | A | 5/1990 | Stapley et al. | |
| 5,046,093 | A | 9/1991 | Wachob | |
| 5,617,323 | A | 4/1997 | Stansberry et al. | |
| 5,650,774 | A | 7/1997 | Drori | |
| 5,661,804 | A | 8/1997 | Dykema et al. | |
| 5,740,428 | A | 4/1998 | Mortimore | |
| 5,808,372 | A | 9/1998 | Schwegler et al. | |
| 5,864,297 | A | 1/1999 | Sollestre et al. | |
| 5,926,103 | A | 7/1999 | Petite | |
| 6,501,369 | B1 * | 12/2002 | Treharne | B60R 25/24 307/10.5 |
| 6,801,967 | B2 | 10/2004 | Nakamura et al. | |
| 6,941,203 | B2 | 9/2005 | Chen | |
| 6,956,460 | B2 | 10/2005 | Tsui | |
| 6,998,956 | B2 | 2/2006 | Dix | |
| 7,124,058 | B2 | 10/2006 | Namaky et al. | |
| 7,315,238 | B2 | 1/2008 | Chambers et al. | |
| 7,375,673 | B2 | 5/2008 | Spilo | |

(Continued)

OTHER PUBLICATIONS

Operator s Instructions DJ-CM2000 Scanner/Transmitter Duplicator.

(Continued)

*Primary Examiner* — George Bugg
*Assistant Examiner* — Renee Dorsey
(74) *Attorney, Agent, or Firm* — Fish & Richardson P.C.

(57) ABSTRACT

A method for distributing a sequence of access codes to a plurality of users, comprising comprises storing a set of sequences of access codes, wherein each sequence of access codes of the set can be programmed for use by a remote access device with an access system of a specific type. A same sequence of access codes is provided to both a first remote access device of a first user and to a second remote access device of a second user.

24 Claims, 6 Drawing Sheets

(56) References Cited

U.S. PATENT DOCUMENTS

| | | | |
|---|---|---|---|
| 7,463,959 | B2 | 12/2008 | Namaky |
| 7,778,186 | B2 | 8/2010 | Oman et al. |
| 7,900,966 | B1 | 3/2011 | Stennett |
| 8,350,670 | B2 * | 1/2013 | Kelly .................. B60R 25/2081 340/426.16 |
| 8,412,401 | B2 | 4/2013 | Bertosa et al. |
| 8,466,774 | B2 | 6/2013 | Lopez et al. |
| 8,584,841 | B1 | 11/2013 | Tiegs |
| 8,854,181 | B2 | 10/2014 | Lopez et al. |
| 8,912,883 | B2 | 12/2014 | Kobres |
| 9,002,536 | B2 | 4/2015 | Hatton |
| 9,171,456 | B2 | 10/2015 | Ramchandani et al. |
| 2003/0112121 | A1 | 6/2003 | Wilson |
| 2003/0189530 | A1 | 10/2003 | Tsui |
| 2004/0066308 | A1 | 4/2004 | Sampsell |
| 2004/0088228 | A1 | 5/2004 | Mercer |
| 2004/0113786 | A1 | 6/2004 | Maloney |
| 2004/0155793 | A1 | 8/2004 | Mui |
| 2004/0252030 | A1 | 12/2004 | Trimble et al. |
| 2005/0024229 | A1 | 2/2005 | Chuey |
| 2005/0212655 | A1 | 9/2005 | Underdahl |
| 2005/0225429 | A1 | 10/2005 | Burzio |
| 2005/0231323 | A1 | 10/2005 | Underdahl et al. |
| 2005/0248436 | A1 | 11/2005 | Hohmann et al. |
| 2005/0269414 | A1 | 12/2005 | Kell et al. |
| 2005/0285724 | A1 | 12/2005 | Schmidt et al. |
| 2005/0288837 | A1 | 12/2005 | Wiegand et al. |
| 2006/0176146 | A1 | 8/2006 | Krishan et al. |
| 2006/0179057 | A1 * | 8/2006 | Moretti .............. G07C 9/00166 |
| 2006/0198523 | A1 | 9/2006 | Shearer |
| 2007/0001805 | A1 | 1/2007 | Utter et al. |
| 2007/0008168 | A1 | 1/2007 | Liao et al. |
| 2007/0096940 | A1 | 5/2007 | Laranang et al. |
| 2007/0120641 | A1 | 5/2007 | Sommer et al. |
| 2007/0176787 | A1 | 8/2007 | Iten et al. |
| 2007/0200671 | A1 * | 8/2007 | Kelley .................. B60R 25/257 340/5.72 |
| 2007/0229301 | A1 | 10/2007 | Katz |
| 2007/0296559 | A1 | 12/2007 | Fehr |
| 2008/0150685 | A1 | 6/2008 | Desai et al. |
| 2009/0113963 | A1 | 5/2009 | Pocrass |
| 2009/0163140 | A1 | 6/2009 | Packham et al. |
| 2009/0171684 | A1 | 7/2009 | Samolinski et al. |
| 2009/0276115 | A1 | 11/2009 | Chen |
| 2009/0298020 | A1 | 12/2009 | Corcoran et al. |
| 2010/0045423 | A1 | 2/2010 | Glickman et al. |
| 2010/0069043 | A1 | 3/2010 | Khawand |
| 2011/0190962 | A1 | 8/2011 | Peterson et al. |
| 2011/0315569 | A1 | 12/2011 | Haag |
| 2012/0008509 | A1 | 1/2012 | Myers et al. |
| 2012/0242506 | A1 | 9/2012 | Nguyen et al. |
| 2012/0249289 | A1 | 10/2012 | Freese et al. |
| 2012/0252365 | A1 | 10/2012 | Lam |
| 2012/0286927 | A1 | 11/2012 | Hagl |
| 2012/0317317 | A1 | 12/2012 | Kristiansson |
| 2013/0069761 | A1 | 3/2013 | Tieman |
| 2013/0226795 | A1 * | 8/2013 | Hopper ................... B60R 25/09 705/44 |
| 2013/0249677 | A1 | 9/2013 | Kohanek et al. |
| 2013/0331976 | A1 | 12/2013 | Freeman |
| 2014/0152882 | A1 | 6/2014 | Samek et al. |
| 2014/0229316 | A1 | 8/2014 | Brandon |
| 2014/0266580 | A1 | 9/2014 | Lopez |
| 2014/0266582 | A1 | 9/2014 | Lopez |
| 2014/0266583 | A1 | 9/2014 | Lopez |
| 2014/0266587 | A1 | 9/2014 | Lopez |

OTHER PUBLICATIONS

Operator's Instructions, CT2000E/CT2000SR, Replacement Remote Control Operation.

Operator's Instructions, Model: RMC888; Duplicator Operating Instruction.

Operator's Instructions, "StingPro—Learning Remote—TX-44".

Operator's Instructions, "Skylink" Model 39, Universal Garage Door Remote Control.

Operator's Instructions, "JMA" CTM-200 Remote Control Duplicator Manual.

* cited by examiner

DISTRIBUTING CAPTURED CODES

CROSS-REFERENCE TO RELATED APPLICATIONS

This application claims priority to U.S. Application Ser. No. 61/793,858, filed on Mar. 15, 2013.

TECHNICAL FIELD

This invention relates to remote keyless vehicle access systems, and more particularly to distributing codes for remote keyless vehicle access systems to use.

BACKGROUND

Wireless signal transmitter-receiver systems are employed in a variety of security systems and remote activation systems. Remote access devices are generally used in the automotive industry to activate and deactivate vehicle access systems. Remote access devices can also perform other tasks including remote starting, locking and unlocking doors, unlatching trunk decks or tail gates, opening windows or doors and operating convertible top mechanisms.

An original remote access device may use a code generator capable of generating a very large number of unique codes to operate with a unique vehicle access system. These codes work with certain vehicle types.

3rd parties might want to build replacement remote access devices, but they might not know the code generator's algorithm or seed.

SUMMARY

One aspect of the invention features a method for distributing a sequence of access codes to a plurality of users. The method comprises storing a set of sequences of access codes, wherein each sequence of access codes of the set can be programmed for use by a remote access device with an access system of a specific type. The method also comprises providing a first sequence of access codes to a first remote access device of a first user to remotely operate a vehicle having the specific type of access system. The method also comprises providing the first sequence of access codes to a second remote access device of a second user to remotely operate a second vehicle having the specific type of access system.

Another aspect of the invention features a server comprising one or more processors and a memory system configured to store a set of sequences of access codes, wherein each sequence of access codes of the set can be programmed for use by a remote access device with an access system of a specific type. The server is configured to provide a first sequence of access codes to a first remote access device of a first user to remotely operate a first vehicle having the specific type of access system. It is also configured to provide the same first sequence of access codes to a second remote access device of a second user to remotely operate a second vehicle having the specific type of access system.

Particular implementations of the subject matter described in this specification can be implemented so as to realize one or more of the following advantages: This invention allows manufacturers of remote access devices and distributors of sequences of access codes to more efficiently distribute the sequences of access codes into remote access devices. They can provide fewer codes to a greater number of remote access devices with minimal risk of the remote access devices interfering with each other.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
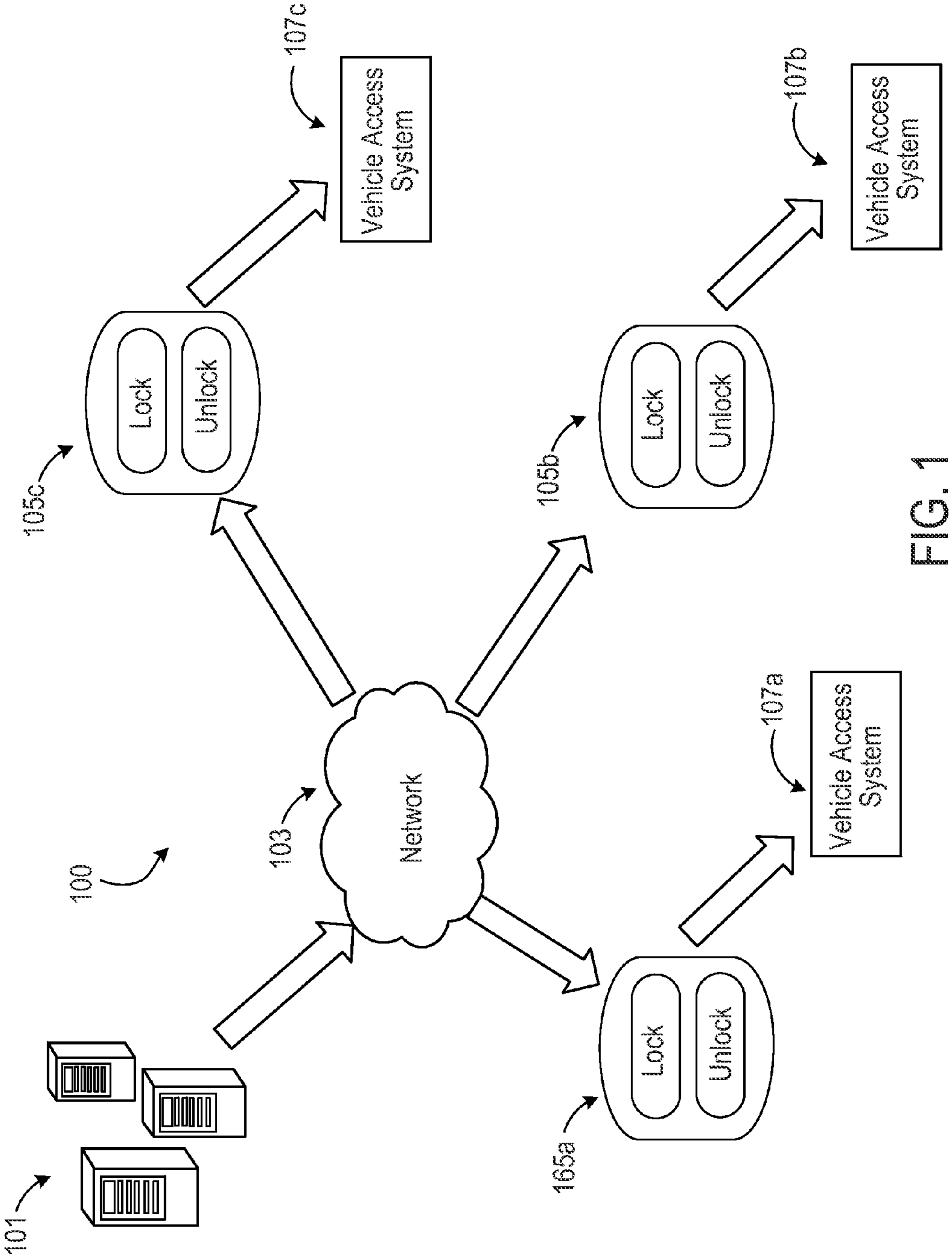
FIG. 1 is a system for distributing sequences of access codes.

FIG. 1 is a system 100 for distributing sequences of access codes. A service provider for remote access devices may store sets of sequences of access codes. Each set contains sequences of access codes that work with certain types of vehicles, e.g., a particular year, make, model, and trim. A server 101 stores the sets of sequences of access codes in a memory. Vehicle owners will request from the server a sequence of access codes that will work with the owner's particular type of vehicle. The server can use one or more processors to process the request and make any necessary decisions.

The server will distribute the sequences of access codes through a communication network 103 such as the internet. The server downloads the sequences into remote access devices 105[*a-c*]. Remote access device 105*a* downloads a first sequence of codes compatible for operation with vehicle access system 107*a* of a first type of vehicle. Remote access device 105*b* downloads a different sequence of codes compatible for use with a vehicle access system 107*b* for the same type of vehicle. Remote access device 105*c* downloads a different sequence of codes compatible for use with vehicle access system 107*c* for a different type of vehicle.

Because remote access devices 105*a* and 105*b* share the same sequence of access codes, they risk operating each other's vehicle access system. Sometimes, a vehicle registration can reduce or eliminate this risk when the vehicle access system registers an ID of the remote access devices that it allows access from, but not every vehicle access system has this capability. Distributing different sequences of access codes, such the different sequence of access codes to remote access device 105*c*, will also reduce or eliminate the risk of cross-operation.

Figure 2:
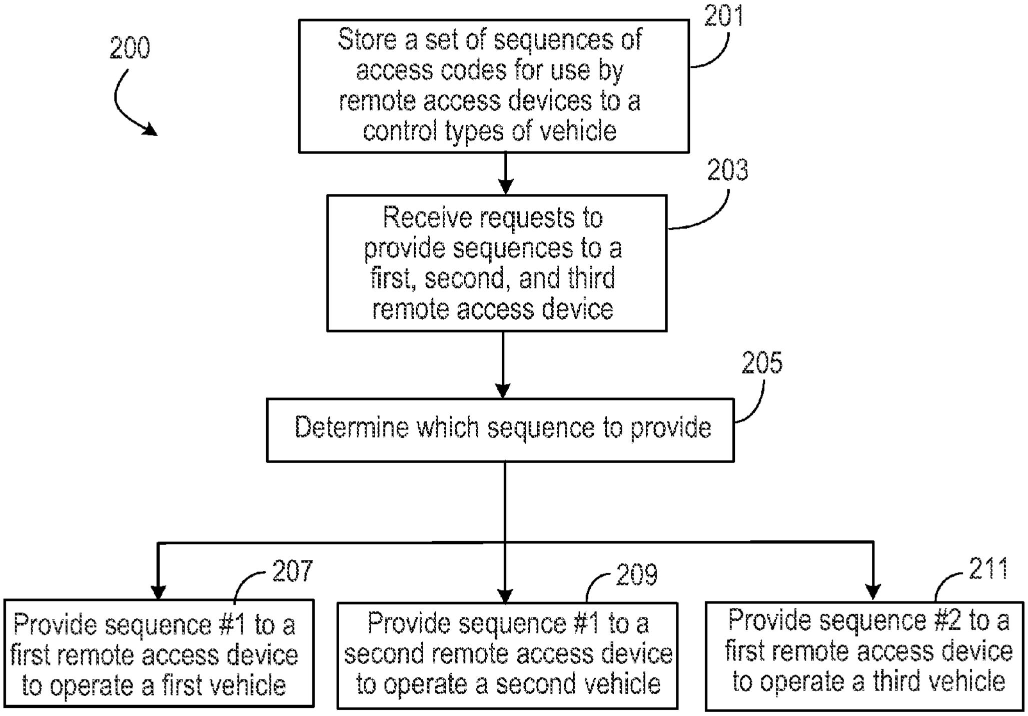
FIG. 2 is a flowchart of a method for distributing sequences of access codes.

FIG. 2 is a flowchart 200 of a method for distributing sequences of access codes. A server stores 201 a set of sequences of access codes that a remote access device can use to operate an access system of a particular type of vehicle. In some examples, the server stores a set of sequences of access codes that a remote access device can use to operate a certain type of access system that can be used with multiple vehicles.

The server receives requests 203 from remote access devices needing to work with an access system of the particular type of vehicle.

The server determines 205 which sequences to provide to which remote access devices. To make the determination, the server can use any of the methods later disclosed, e.g., as shown by the later flowcharts of FIGS. 3-6. Sometimes, it may provide a sequence that it did not previously provide to another remote access device.

The server decides to provide 207 sequence #1 to a first remote access device. It may also provide 209 sequence #1 to a second remote access device after determining remote access device #2 will not likely interfere with the operation of remote access device #1. It may provide 211 sequence #3 to a third remote access device.

Figure 3:
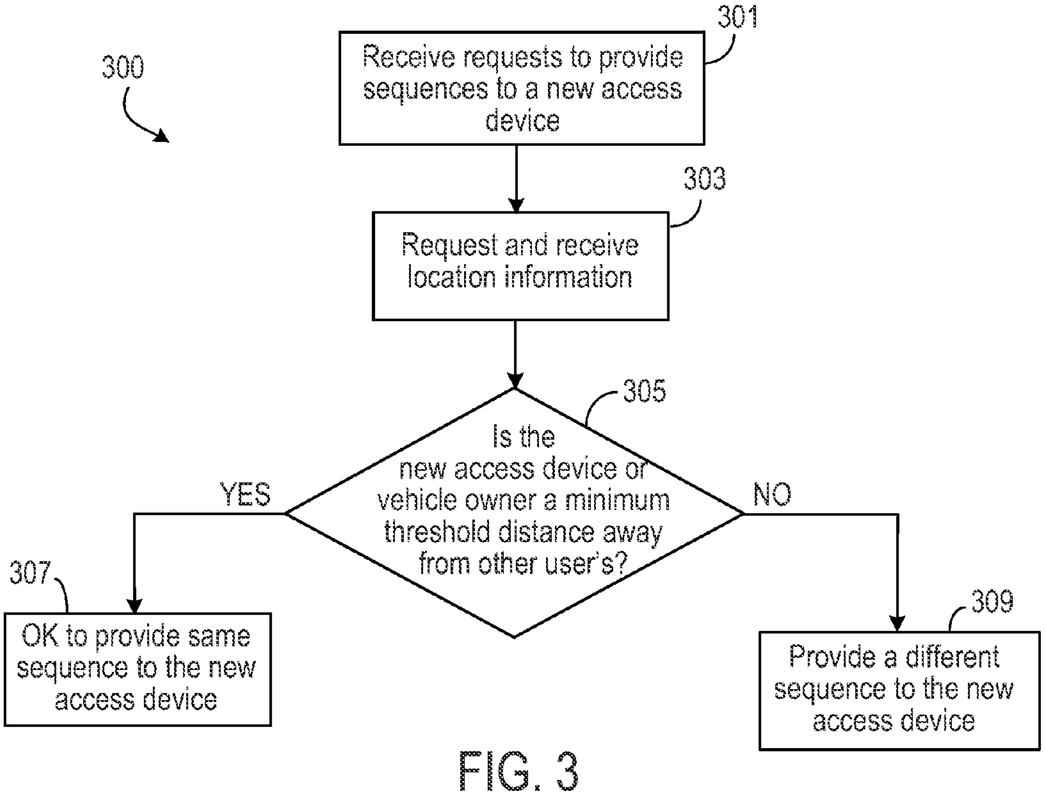
FIG. 3 is a flowchart of a method for determining which sequence of access codes to distribute.

FIG. 3 is a flowchart 300 of a method for determining which sequence of access codes to distribute based on location. A vehicle owner sends a request to a server to download a sequence of access codes compatible with the owner's vehicle type onto the vehicle owner's remote access device. A server receives 301 the request and identifies the set of sequences of access codes that work with the owner's vehicle type.

The server may request 303 location information about the vehicle, the owner, or the remote access device. The server uses the location information to determine 305 if the remote access device is or will be used at least a minimum threshold distance away from other remote access devices using a certain sequence. The minimum distance can be a distance such as 1 mile or 1,000 miles. Alternatively, it can be based on a geographic boundary, such as by state, zip code, city, country, etc.

If the distance between the remote access devices exceeds the minimum threshold distance, the server can provide 307 the same certain sequence of access values that it previous provided for use to a different vehicle access device for use with a different owner's vehicle. If the distance between the remote access devices does not exceed the minimum distance threshold, then the server provides 309 a new sequence of access values for download into the requesting owner's remote access device, the new sequence of access values having not been previously provided to a different owner to download into a different remote access device.

Figure 4:
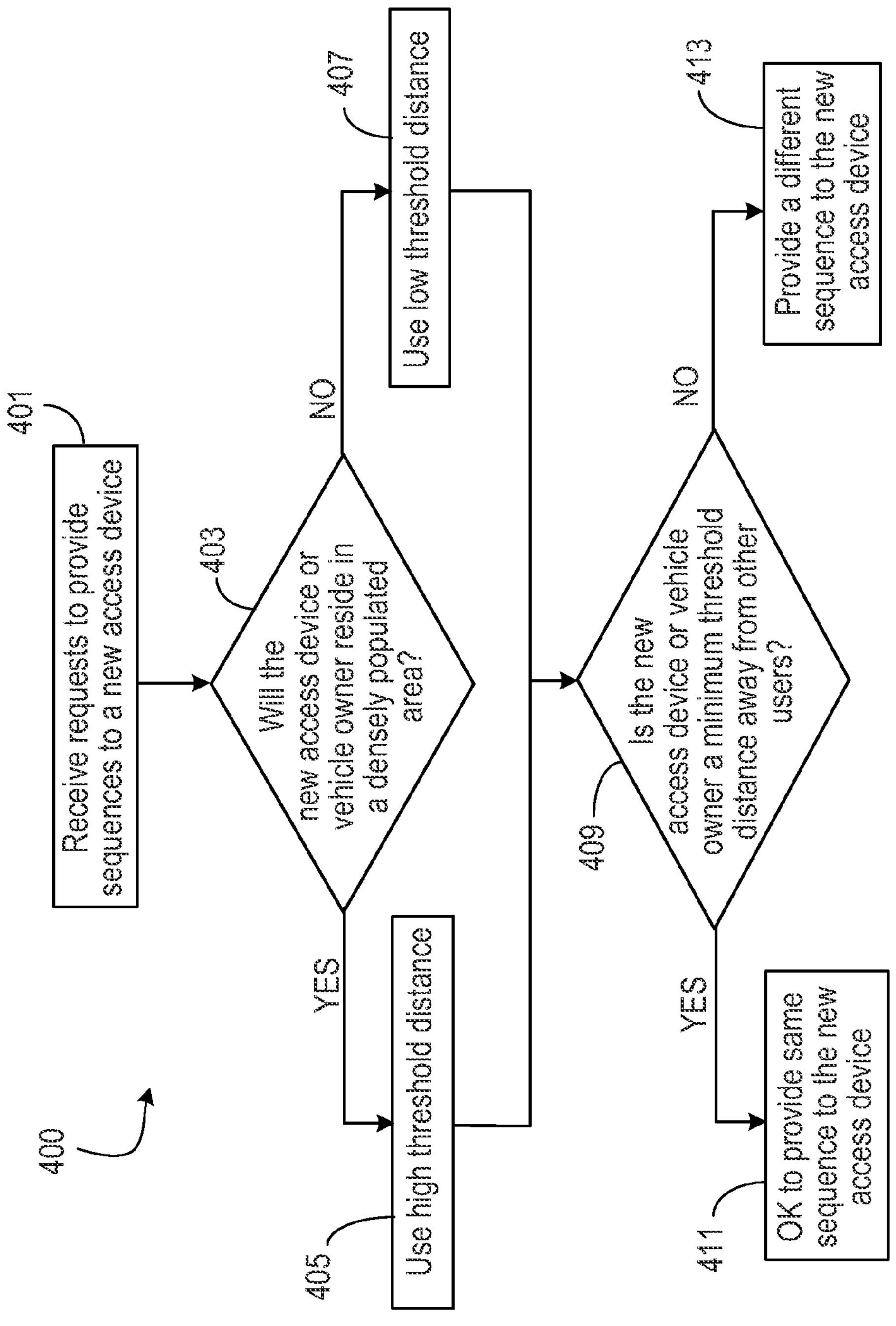
FIG. 4 is a flowchart of another method for determining which sequence of access codes to distribute.

FIG. 4 is a flowchart 400 of another method for determining which sequence of access codes to distribute. A vehicle owner sends a request to a server to download a sequence of access codes compatible with the owner's vehicle type onto the owner's remote access device. A server receives 401 the request and identifies the set of sequences of access codes that work with the owner's vehicle type.

The server may request location information about the vehicle, the owner, or the remote access device. The server uses the location information to determine 403 if the vehicle, vehicle's owner, or remote access device reside in a densely populated area. It may also determine if other vehicles, owners, or access devices that have used a certain sequence of vehicle access codes reside in a densely populated area. If yes, then the server may set 405 a high threshold distance, e.g., 1000 miles or a certain state. If no, then a server may set a low 407 threshold distance, e.g., 100 miles or a county, city, or zip code boundary.

The server then decides 409 if the distance between the remote access device and other remote access devices exceed the minimum threshold distance. If the minimum distance threshold is met, then the server can provide 411 a same sequence of access values that it previous provided for use to a different vehicle access device for use with a different owner's vehicle. If the distance threshold is not met, then the server provides 413 a new sequence of access values for download into the requesting owner's remote access device, the new sequence of access values having not been previously provided to a different owner to download into a different remote access device.

Figure 5:
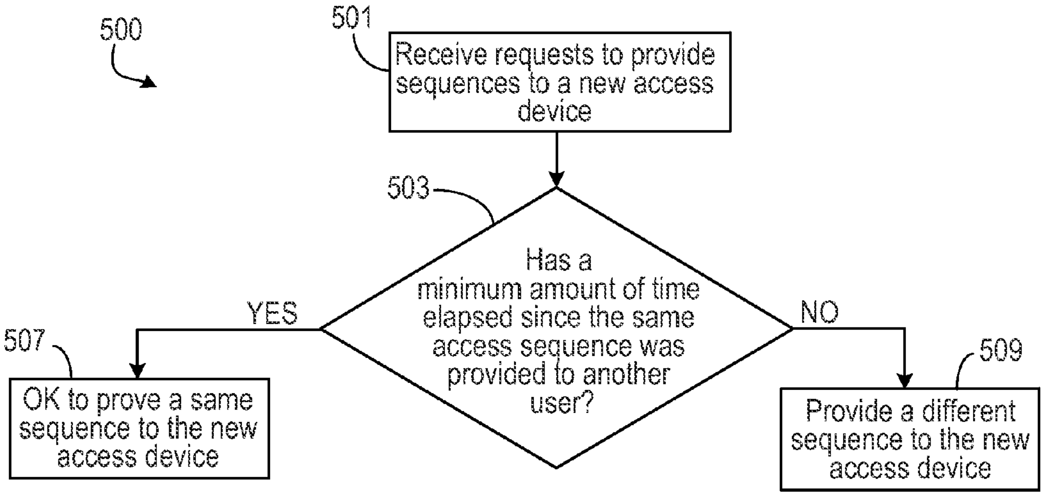
FIG. 5 is a flowchart of another method for determining which sequence of access codes to distribute.

FIG. 5 is a flowchart 500 of another method for determining which sequence of access codes to distribute. A vehicle owner sends a request to a server to download a sequence of access codes compatible with the owner's vehicle type onto the vehicle owner's remote access device. A server receives 501 the request and identifies the set of sequences of access codes that work with the owner's vehicle type.

The server uses time information, e.g., the time of the request, to determine 503 if a minimum amount of time elapsed since the server last provided a certain sequence to a different access device. The minimum elapsed time can be, for example, 1 year or 10 years. The minimum elapsed time may be set differently for users at different locations, e.g. based on distance or population density.

If the elapsed time exceeds the minimum amount of time, the server can provide 507 the same certain sequence of access values that it previous provided for use to a different vehicle access device for use with a different owner's vehicle. If the elapsed time does not exceed the minimum amount of time, then the server provides 509 a new sequence of access values for download into the requesting owner's remote access device, the new sequence of access values having not been previously provided to a different owner to download into a different remote access device.

Figure 6:
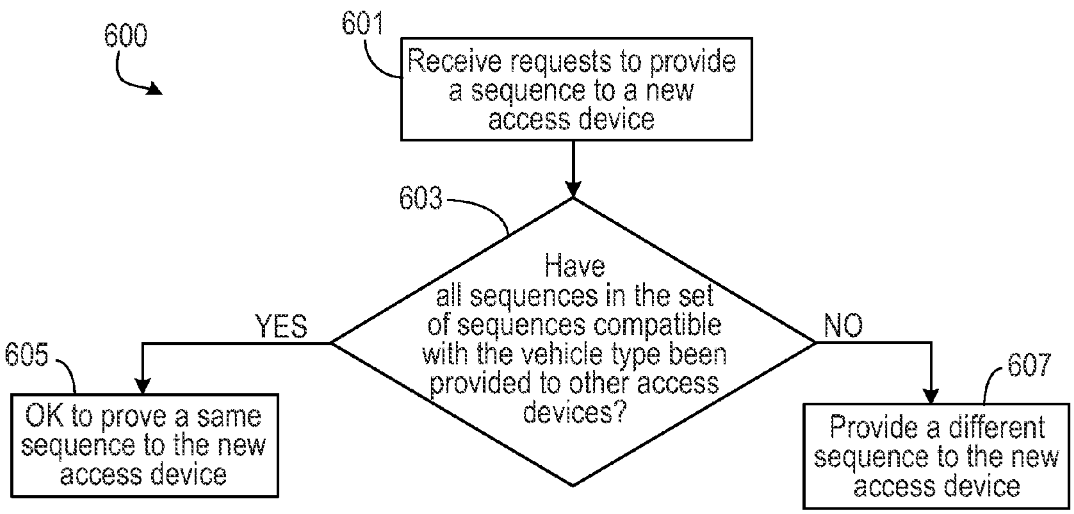
FIG. 6 is a flowchart of a method for deciding when to start using the distribution methods.

FIG. 6 is a flowchart 600 of a method for deciding when to start using the distribution methods. A vehicle owner sends a request to a server to download a sequence of access codes compatible with the owner's vehicle type onto the owner's remote access device. A server receives 601 the request and identifies the set of sequences of access codes that work with the owner's vehicle type.

The server checks 603 if it previously provided all of the sequences in the set to other access devices of other vehicle owners. If not, the server provides 607 a previously unused sequence to the vehicle access device of the requesting owner. If so, then the server can provide 605 a previously used sequence of access codes. In doing so, the service may ensure that it did not provide a different owner same sequence of access codes within a minimum distance or time, e.g., by using methods in FIGS. 3-5.

Figure 7:
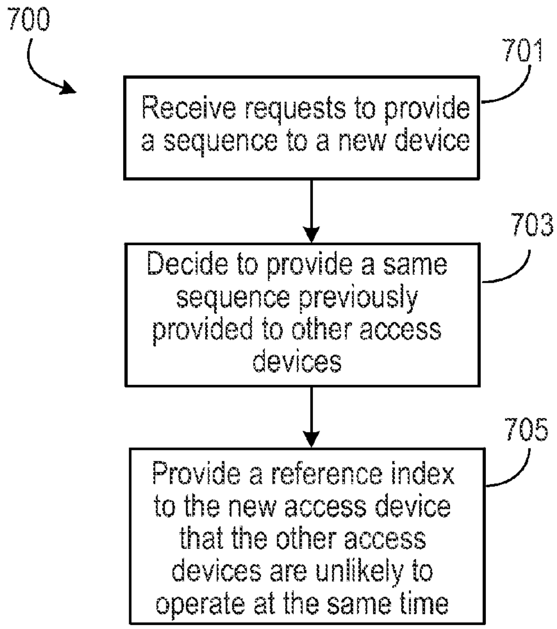
FIG. 7 is a flowchart of a method for distributing indexes of a sequence of access codes.

FIG. 7 is a flowchart 700 of a method for distributing indexes of a sequence of access codes. A vehicle owner sends a request to a server to download a sequence of access codes compatible with the owner's vehicle type onto the owner's remote access device. A server receives 701 the request and identifies the set of sequences of access codes that work with the owner's vehicle type.

The server may decide 703 to provide a previously used sequence to the access device of the owner, e.g., by using methods in FIGS. 3-5. Having done so, it may also provide 705 an reference index to the remote access device of the requesting owner. The remote access device begins issuing codes from the sequence at the position in the sequence specified by the reference index.

For example, a sequence of access codes may contain 200,000 access codes. The server may have previously provided to an access device the sequence of access codes with a reference index to start at the first access code. Now, the server provides to the access device of the requesting owner the same sequence of codes with a reference index to start at a different point, e.g., the 100,000th code.

Alternatively, the server may distribute the index in other ways, such has incrementally, algorithmically, or randomly. Examples of algorithms include calculating the farthest unused index and calculating an expected index that a previous user may be currently using. For example, a user starting at the first index of a sequence may, on average, increment 5 indexes per day and reach index 5000 after 1000 days, so a second user given the same sequence can be given the first index again, but not the index of 5000.

Techniques for distributing the indexes can employ variations of the methods used for distributing sequences shown in FIGS. 3-7.

A number of embodiments of the invention have been described. Nevertheless, it will be understood that various modifications may be made without departing from the spirit and scope of the invention. For example, the information requested or used in the determinations may comprise information about a vehicle's location, a vehicle owner's location, or an expected use location instead of location about the remote access device. The various methods shown by the figures can be varied and rearranged, and they can be used in parallel, sequence, or combination with the methods shown by other figures. Accordingly, other embodiments are within the scope of the following claims.

What is claimed is:

1. A method for distributing a sequence of access codes to a plurality of users, comprising:

storing a set of sequences of access codes, wherein each sequence of access codes of the set can be programmed for use by a remote access device configured to issue one or more access codes from the sequence of access codes to gain access to a vehicle having a certain type of access system;

receiving a first request to program a first remote access device of a first user for a first vehicle that has the certain type of access system;

providing a first sequence of access codes to the first remote access device of the first user for use in the first remote access device to remotely operate the first vehicle that has the certain type of access system;

receiving a second request to program a second remote access device of a second user for a second vehicle that has the certain type of access system; and providing the first sequence of access codes to the second remote access device of the second user for use in the second remote access device to remotely operate the second vehicle that has the certain type of access system.

2. The method of claim 1, wherein providing the first sequence of access codes to the second remote access device of the second user comprises:

determining that the second user is located at least a threshold distance away from the first user; and in response, providing the first sequence of access codes to the second remote access device of the second user.

3. The method of claim 1, wherein providing the first sequence of access codes to the second remote access device of the second user comprises:

determining that a minimum amount of time elapsed after providing the first sequence of access codes to the first remote access device of the first user; and in response, providing the first sequence of access codes to the second remote access device of the second user.

4. The method of claim 1, further comprising:

providing each sequence of access codes in the set to a respective different remote access device; and wherein providing the first sequence of access codes to the second remote access device of the second user occurs in response to providing each sequence of access codes in the set to a respective different remote access device.

5. The method of claim 1, wherein the set of sequences of access codes is stored onto a centralized server configured to be accessible from distributed access points.

6. The method of claim 1, further comprising:

providing a first index referencing a first access code of the first sequence of access codes to the first remote access device of the first user; and providing a different index referencing a different access code of the first sequence of access codes to the second remote access device of the second user.

7. A server comprising:

one or more processors; and a memory system configured to store a set of sequences of access codes, wherein each sequence of access codes of the set can be programmed for use by a remote access device configured to issue one or more access codes from the sequence of access codes to gain access to a vehicle having a certain type of access system;

wherein the server is configured to:

receive a first request to program a first remote access device of a first user for a first vehicle that has the certain type of access system;

provide a first sequence of access codes to the first remote access device of the first user for use in the first remote access device to remotely operate the first vehicle that has the certain type of access system;

receive a second request to program a second remote access device of a second user for a second vehicle that has the certain type of access system; and provide the first sequence of access codes to the second remote access device of the second user for use in the second remote access device to remotely operate the second vehicle that has the certain type of access system.

8. The server of claim 7 further configured to:

determine that the second user is located at least a threshold distance away from the first user; and provide the first sequence of access codes to the second remote access device of the second user in response to determining that the second user is located at least a threshold distance away from the first user.

9. The server of claim 7 further configured to:

determine that a minimum amount of time elapsed after providing the first sequence of access codes to the first remote access device of the first user; and provide the first sequence of access codes to the second remote access device of the second user occurs in response to determining that a minimum amount of time elapsed after providing the first sequence of access codes to the first remote access device of the first user.

10. The server of claim 7 further configured to:

provide each sequence of access codes in the set to a respective different remote access device; and wherein providing the first sequence of access codes to the second remote access device of the second user occurs in response to providing each sequence of access codes in the set to a respective different remote access device.

11. The server of claim 7, wherein the server is configured to connect through a remote network to a plurality of remote access devices.

12. The server of claim 7, further configured to:

provide a first index referencing a first access code of the first sequence of access codes to the first remote access device of the first user; and provide a different index referencing a different access code of the first sequence of access codes to the second remote access device of the second user.

13. A system comprising:

a plurality of remote access devices, each remote access device being configured to issue a code from a sequence of access codes stored in a memory of the remote access device in response to a user pressing a button on the remote access device; and a server storing a set of sequences of access codes for a particular vehicle access system type, wherein each sequence of access codes is selected so that a remote access device issuing one or more codes from the sequence of access codes can gain access to a vehicle having the particular vehicle access system type, the server configured to perform operations comprising:

receiving a first request to program a first remote access device for a first vehicle having a first vehicle access system of the particular vehicle access system type;

providing a first sequence of access codes from the set for use in the first remote access device;

receiving a second request to program a second remote access device for a second vehicle having a second vehicle access system of the particular vehicle access system type; and providing the first sequence of access codes for use in the second remote access device.

14. The system of claim 13, wherein providing the first sequence of access codes for use in the second remote access device comprises:

determining that the second remote access device is located at least a threshold distance away from the first remote access device; and in response, providing the first sequence of access codes to the second remote access device.

15. The system of claim 13, wherein providing the first sequence of access codes for use in the second remote access device comprises:

determining that a minimum amount of time elapsed after providing the first sequence of access codes to the first remote access device; and in response, providing the first sequence of access codes to the second remote access device.

16. The system of claim 13, wherein the operations further comprise:

providing each sequence of access codes in the set to a respective different remote access device, wherein providing the first sequence of access codes for use in the second remote access device occurs in response to providing each sequence of access codes in the set to a respective different remote access device.

17. The system of claim 13, wherein the server is configured to be accessible from distributed access points.

18. The system of claim 13, wherein the operations further comprise:

providing a first index referencing a first access code of the first sequence of access codes to the first remote access device; and providing a different index referencing a different access code of the first sequence of access codes to the second remote access device.

19. The method of claim 1, wherein the remote access device is configured to issue one or more access codes from the sequence of access codes in response to a user pressing a button on the remote access device.

20. The server of claim 7, wherein the remote access device is configured to issue one or more access codes from the sequence of access codes in response to a user pressing a button on the remote access device.

21. A method for distributing a sequence of access codes to a plurality of users, comprising:

storing a set of sequences of access codes, wherein each sequence of access codes of the set can be programmed for use by a remote access device with a certain type of access system;

providing a first sequence of access codes to a first remote access device of a first user to remotely operate a first vehicle that has the certain type of access system; and providing the first sequence of access codes to a second remote access device of a second user to remotely operate a second vehicle that has the certain type of access system, wherein providing the first sequence of access codes to the second remote access device of the second user comprises:

determining that the second user is located at least a threshold distance away from the first user; and in response, providing the first sequence of access codes to the second remote access device of the second user.

22. A method for distributing a sequence of access codes to a plurality of users, comprising:

storing a set of sequences of access codes, wherein each sequence of access codes of the set can be programmed for use by a remote access device with a certain type of access system;

providing a first sequence of access codes to a first remote access device of a first user to remotely operate a first vehicle that has the certain type of access system; and providing the first sequence of access codes to a second remote access device of a second user to remotely operate a second vehicle that has the certain type of access system, wherein providing the first sequence of access codes to the second remote access device of the second user comprises:

determining that a minimum amount of time elapsed after providing the first sequence of access codes to the first remote access device of the first user; and in response, providing the first sequence of access codes to the second remote access device of the second user.

23. A method for distributing a sequence of access codes to a plurality of users, comprising:

storing a set of sequences of access codes, wherein each sequence of access codes of the set can be programmed for use by a remote access device with a certain type of access system;

providing a first sequence of access codes to a first remote access device of a first user to remotely operate a first vehicle that has the certain type of access system;

providing the first sequence of access codes to a second remote access device of a second user to remotely operate a second vehicle that has the certain type of access system, providing each sequence of access codes in the set to a respective different remote access device, and wherein providing the first sequence of access codes to the second remote access device of the second user occurs in response to providing each sequence of access codes in the set to a respective different remote access device.

24. A method for distributing a sequence of access codes to a plurality of users, comprising:

storing a set of sequences of access codes, wherein each sequence of access codes of the set can be programmed for use by a remote access device with a certain type of access system;

providing a first sequence of access codes to a first remote access device of a first user to remotely operate a first vehicle that has the certain type of access system;

providing the first sequence of access codes to a second remote access device of a second user to remotely operate a second vehicle that has the certain type of access system;

providing a first index referencing a first access code of the first sequence of access codes to the first remote access device of the first user; and providing a different index referencing a different access code of the first sequence of access codes to the second remote access device of the second user.

* * * * *